US008754139B2

(12) United States Patent
Allen et al.

(10) Patent No.: US 8,754,139 B2
(45) Date of Patent: Jun. 17, 2014

(54) POLYAMIDE MEMBRANES WITH FLUOROALCOHOL FUNCTIONALITY

(75) Inventors: Robert David Allen, San Jose, CA (US); Na Young-Hye, San Jose, CA (US); Ratnam Sooriyakumaran, San Jose, CA (US); Masaki Fujiwara, Cupertino, CA (US); Kazuhiro Yamanaka, San Jose, CA (US)

(73) Assignees: International Business Machines Corporation, Armonk, NY (US); Central Glass Co., Ltd., Tokyo (JP)

( * ) Notice: Subject to any disclaimer, the term of this patent is extended or adjusted under 35 U.S.C. 154(b) by 153 days.

(21) Appl. No.: 12/390,127

(22) Filed: Feb. 20, 2009

(65) Prior Publication Data

US 2010/0216899 A1 Aug. 26, 2010

(51) Int. Cl.
C08J 5/20 (2006.01)

(52) U.S. Cl.
USPC ............................................... 521/27; 521/25

(58) Field of Classification Search
USPC ..................................................... 521/27, 25
See application file for complete search history.

(56) References Cited

U.S. PATENT DOCUMENTS

| | | | |
|---|---|---|---|
| 2,708,617 A | 5/1955 | Magat et al. | |
| 3,006,899 A | 10/1961 | Hill, Jr. et al. | |
| 3,637,594 A | 1/1972 | Gallus et al. | |
| 4,039,440 A | 8/1977 | Cadotte | |
| 4,277,344 A | 7/1981 | Cadotte | |
| 4,520,044 A | 5/1985 | Sundet | |
| 4,705,540 A | 11/1987 | Hayes | |
| 4,717,394 A | 1/1988 | Hayes | |
| 4,721,772 A | 1/1988 | Ueno et al. | |
| 4,769,148 A | 9/1988 | Fibiger et al. | |
| 4,845,183 A | 7/1989 | Mueller et al. | |
| 4,939,215 A | 7/1990 | Mueller et al. | |
| 5,042,992 A | 8/1991 | Blinka et al. | |
| 5,243,019 A | 9/1993 | Takeda et al. | |
| 5,593,588 A | 1/1997 | Kim et al. | |
| 5,922,104 A | 7/1999 | Park et al. | |
| 6,210,584 B1 | 4/2001 | Martin et al. | |
| 7,629,434 B2 | 12/2009 | Saegusa et al. | |
| 7,825,280 B2 | 11/2010 | Saegusa et al. | |
| 2007/0163951 A1 | 7/2007 | McGrath et al. | |
| 2008/0035575 A1 | 2/2008 | Partridge et al. | |
| 2008/0277334 A1 | 11/2008 | Ohara et al. | |
| 2009/0188863 A1* | 7/2009 | Knapp et al. | ...... 210/640 |
| 2010/0029895 A1 | 2/2010 | Narizuka et al. | |
| 2010/0216899 A1 | 8/2010 | Allen et al. | |

FOREIGN PATENT DOCUMENTS

| | | |
|---|---|---|
| EP | 0099997 A1 | 2/1984 |
| EP | 1783158 A1 | 5/2007 |
| EP | 1 810 963 A1 | 7/2007 |
| JP | 2001-137675 | 5/2001 |
| KR | 2005-0103992 | 11/2005 |
| WO | WO 90/02602 | 3/1990 |
| WO | WO 2006/041115 A1 | 4/2006 |
| WO | WO 2006/043501 A1 | 4/2006 |
| WO | WO 2008/069812 A1 | 6/2008 |
| WO | WO 2008/069813 A1 | 6/2008 |
| WO | WO 2008/075516 A1 | 6/2008 |
| WO | 2009097322 A1 | 8/2009 |

OTHER PUBLICATIONS

Robert J. Petersen, "Composite reverse osmosis and nanofiltration membranes," Journal of Membrane Science, 83 (1993) pp. 81-150.
R. L. Riley et al., "Spiral-Wound Poly (Ether/Amide) Thin-Film Composite Membrane Systems", Desalination, 19 (1976) pp. 113-126.
International Search Report and Written Opinion from corresponding PCT Application Serial No. PCT/US2010/024593 mailed May 12, 2010 (10 pages).
Steve Lien-Chung Hsu et al., "Preparation of polybenzoxazole fibers via electrospinning and postspun thermal cyclization of polyhydroxyamide", Journal of Polymer Science: Part A. Polymer Chemistry, 2008 (2 pages) Abstract Only.
Stanley R. Sandler et al., Polymer Synthesis, vol. 1, pp. 88-115 (1974).
Michael Romeo et al., "Novel photodefinable low-k dielectric polymers based on polybenzoxazines", Proc. of SPIE, vol. 6519 (2007) 7 pages.
Starks (in Phase-Transfer Catalysis: ACS Symposium Series, American Chemical Society, Washington DC 1987; Chapter 1, p. 1-7).
Search Report and Written Opinion from corresponding PCT Application Serial No. PCT/US2010/024595 mailed May 12, 2010 (11 pages).
International Preliminary Report on Patentability of international application No. PCT/US2010/024595, dated Sep. 1, 2011, 7 pp.
International Preliminary Report on Patentability of international application No. PCT/US2010/024593, dated Sep. 1, 2011, 6 pp.
Office Action from U.S. Appl. No. 12/390,118, dated Jul. 1, 2011, 21 pages.
Response to Final Office Action mailed Feb. 6, 2013, from U.S. Appl. No. 12/390,118, filed Jun. 6, 2013, 17 pp.
Office Action from U.S. Appl. No. 12/390,118 dated Aug. 9, 2013 (35 pages).
Odian (Principles of Polymerization, Fourth Edition, Wiley Interscience 2004, pp. 90-92).
Patrick, Instant Notes in Organic Chemistry, 2nd Edition, Taylor and Francis, 2004, p. 85.
Office Action from U.S. Appl. No. 12/390,118, dated Oct. 2, 2012, 24 pp.
English Summary of Japanese Office Action from corresponding Japanese Application No. 2011-548435 dated Jan. 22, 2013 (1 page).
Office Action from related U.S. Appl. No. 12/390,118 dated Feb. 6, 2013 (11 pages).

(Continued)

Primary Examiner — Edward Cain
(74) Attorney, Agent, or Firm — Shumaker & Sieffert, P.A.

(57) ABSTRACT

A polymeric membrane includes an active layer on a support. The active layer includes a polymer with a backbone, and the backbone has attached thereto at least one fluoroalcohol moiety.

34 Claims, 5 Drawing Sheets

(56) References Cited

OTHER PUBLICATIONS

Final Office Action from related U.S. Appl. No. 12/390,118 dated Nov. 21, 2011 (8 pages).
Response to Final Office Action from related U.S. Appl. No. 12/390,118 dated Nov. 21, 2011 filed Jan. 23, 2012 (8 pages).
Advisory Action from related U.S. Appl. No. 12/390,118 dated Feb. 8, 2012 (8 pages).
Notice of Appeal from related U.S. Appl. No. 12/390,118, filed Feb. 21, 2012 (1 page).
Amendment from related U.S. Appl. No. 12/390,118, filed Jan. 2, 2013 (21 pages).
Response to Final Office Action dated Nov. 21, 2012, and Advisory Action dated Feb. 8, 2012, from U.S. Appl. No. 12/390,118, 20 pp.
Response filed Dec. 9, 2013 to the Office Action dated Aug. 9, 2013 in U.S. Appl. No. 12/390,118.
Final Office Action dated Dec. 18, 2013 in U.S. Appl. No. 12/390,118, 13 pgs.
Response to Office Action dated Jul. 1, 2011 from U.S. Appl. No. 12/390,118, filed Nov. 1, 2011 (8 pages).

* cited by examiner

FIG. 1

Polysulfone Support

FIG. 2A

HFA-MDA Polyamide
on Psf Support

POLYAMIDE MEMBRANES WITH FLUOROALCOHOL FUNCTIONALITY

TECHNICAL FIELD

In one aspect, the present invention relates to polyamide membranes with fluoroalcohol functionality. The membranes can be used, for example, in water purification, desalination and gas separation processes.

BACKGROUND

Thin film composite (TFC) membranes including ultrathin active layers and porous supports have been widely used in reverse osmosis (RO) or nanofiltration (NF) processes for desalination. In TFC membranes, the active layer controls separation properties, while the support layer enhances mechanical strength. The cross-linked aromatic polyamide produced by interfacial polymerization of m-phenylenediamine (MPD) and trimesoyl chloride (TMC) has been a successful commercial product. However, the aromatic polyamides making up the active layer are sensitive to chemical disinfectants such as chlorine, and the chemical attack by disinfectants ultimately results in membrane failure as measured by enhanced passage of both salt and water.

Chlorine is commonly used upstream from desalination process (RO/NF) to kill bacteria and other organisms. Since current desalination membranes with aromatic polyamide active layers degrade when exposed to chlorine, current installations require an extra process step to remove chlorine prior to RO. For municipal systems, the purified water then has to be re-chlorinated. These extra steps could be eliminated if the active layers were more tolerant to chlorine.

Additional coating layers have been applied on the aromatic polyamides, and/or the aromatic polyamides have been chemically modified to enhance chlorine resistance. In addition, new polymers without chlorine sensitive reactive sites (for example, sulfonated poly((arylene ether sulfone) polymers) have been proposed, and these systems have improved stability in the presence of chlorine agents. However, the membranes made from these polymeric materials have limited performance compared to conventional aromatic polyamides. In addition, some of the systems required difficult synthetic work or were difficult to fabricate, which increases membrane manufacturing costs.

SUMMARY

Preferred embodiments are directed to membrane materials that exhibit high chlorine resistance and high flux and rejection performance, and that can also be easily synthesized at a reasonable cost with currently available manufacturing processes.

Preferred embodiments are directed to polyamide composite membranes having active layers with fluoroalcohol functionality. The membranes can be easily synthesized by interfacial polymerization, which has been demonstrated to be an economical membrane manufacturing process.

The fluoroalcohol functional polyamides disclosed herein, which have an excellent balance of hydrophilicity and hydrophobicity, have a number of advantages in RO/NF processes. Membrane performance (flux and rejection) can be controlled by modulating the degree of ionization of the fluoroalcohol groups on the polymer backbone. In addition, the electron withdrawing and steric effects contributed by the fluoroalcohol functionality may reduce the chance for electrophilic attack by chlorine on the aromatic rings in the amide group in the polymer backbone, which is a major problem causing performance decline in current aromatic polyamide membranes. Thus, the membranes made from the fluoroalcohol substituted polyamides provide enhanced chemical stability, especially to attack by oxidizing agents. Further, the fluoroalcohol moieties can be easily modified by functional monomers to improve membrane performance, such as, for example, by adding an anti-fouling coating through graft polymerization. In addition, the non-adhesive properties of the fluorine may make the fluoroalcohol substituted polyamides more resistant to fouling.

In one aspect, the present invention is directed to a polymeric membrane including an active layer that is on a support, wherein the active layer includes a polymer with a backbone, and wherein the backbone has attached thereto at least one fluoroalcohol moiety.

In another aspect, the present invention is directed to a process for making a membrane, including inserting a support membrane into an aqueous base solution including a monomeric polyamine reactant having one or more hexafluoroalcohol groups represented by Formula 1:

Formula 1 wherein $R^0$ represents an organic group selected from the group consisting of aliphatic, alicyclic, aromatic, heterocyclic groups and combinations thereof, m is an integer of 2 or more, and n is an integer of 1 or more; and inserting the support membrane having thereon the aqueous base solution into an organic solution comprising a monomeric polyfunctional acyl halide reactant represented by Formula 2:

$$R^1\text{-}(COX)_p \qquad \text{Formula 2}$$

wherein $R^1$ represents an organic group selected from the group containing aliphatic alicyclic, aromatic, heterocyclic groups and combinations thereof, X is selected from the group consisting of fluorine, chlorine, bromine and iodine, and p represents an integer of 2 or more.

The details of one or more embodiments of the invention are set forth in the accompanying drawings and the description below. Other features, objects, and advantages of the invention will be apparent from the description and drawings, and from the claims.

DETAILED DESCRIPTION

In one aspect, the present invention is directed to a thin film composite (TFC) membrane construction including an active layer on a support layer. The active layer includes a polymer with at least one fluoroalcohol moiety pendant from the polymer backbone. The fluoroalcohol moiety pendant from the polymer backbone may be in either a neutral or an ionized form. The chemical composition of the fluoroalcohol groups on the backbone can vary widely depending on the membrane's intended application, but hexafluoroalcohol (HFA) moieties are preferred for their balance of hydrophilicity and hydrophobicity. The polymers making up the active layer may optionally be crosslinked.

In one embodiment, the polymer making up the active layer of the TFC membrane includes a polyamide backbone and at least one fluoroalcohol moiety, preferably at least one hexafluoroalcohol (HFA) moiety, pendant from the backbone. The fluoroalcohol moiety pendant from the polymer backbone may be in either a neutral or an ionized form.

The support layer of the TFC membrane, which is adjacent the active layer, may vary widely depending on the intended application. Any ultrafiltration membrane can be used as a support layer for making RO/NF membranes through interfacial polymerization, and polyethersulfone, poly(vinylidene fluoride), polyetherimide and polyacrylonitrile would be suitable for use with the fluoroalcohol functional polymers described herein.

To provide optimum flux and rejection performance, the active layer of the TFC membrane should be relatively thin, and the active layer typically has a thickness of about 50 to about 800 nm, or about 100 to about 400 nm.

The TFC membrane active layers described herein are readily made using interfacial polymerization methods. In this application the term interfacial polymerization refers to a polymerization reaction that occurs at or near the interfacial boundary of two immiscible solutions.

In one embodiment, the active layer of a TFC membrane is derived from an interfacial polymerization reaction between:
an aqueous, base chemical mixture (A) including a monomeric polyamine reactant having one or more hexafluoroalcohol groups, represented by Formula 1:

Formula 1 wherein
$R^0$ represents an organic group selected from aliphatic, alicyclic, aromatic, heterocyclic groups and combinations thereof, n represents an integer of 1 or more, 1 to 20, or 1 to 8; and m represents an integer of 2 or more, 2 to 20, or 2 to 8;
is reacted with:
an organic chemical mixture (B) including a monomeric polyfunctional acyl halide reactant, represented by Formula 2:

Formula 2 wherein
$R^1$ represents an organic group selected from aliphatic alicyclic, aromatic, heterocyclic groups and combinations thereof, X is selected from fluorine, chlorine, bromine and iodine, and p represents an integer of 2 or more, 2 to 20, or 2 to 8.

The aqueous, basic chemical mixture (A) and the organic chemical mixture (B) are immiscible with each other. When (A) and (B) are placed in contact, immiscible means that there is an interface between (A) and (B). The chemical mixtures (A) and (B) can independently be solutions, dispersions, or combinations thereof. Preferably, both (A) and (B) are solutions, and will be referred to in the discussion that follows as solutions.

While not wishing to be bound by any theory, presently available evidence indicates that the basic aqueous solution (A) makes the polyamine monomeric reactant soluble while substantially reducing or eliminating undesirable side-reactions (such as esterification) during the interfacial polymerization process.

In some embodiments, $R^0$ in the monomeric polyamine reactant of Formula 1 represents an organic group with 2 to 30 carbon atoms, or 2 to 20 carbon atoms, or 6 to 20 carbon atoms. For example, $R^0$ can include an aromatic organic group selected from benzene rings, naphthalene rings, cyclohexane rings, admanthane rings, norbornane rings and combinations thereof.

In one embodiment, in the monomeric polyamine reactant of Formula 1, $R^0$ is an organic group represented by Formula 3:

Formula 3 wherein Y represents an organic group selected from $CH_2$, O, S, C=O, $SO_2$, $C(CH_3)_2$, $C(CF_3)_2$ and combinations thereof, and r represents an integer of 0 or 1. In Formula 3, a monovalent amino ($NH_2$) and a monovalent hexafluoroalkyl [$C(CF_3)_2OH$] group are each chemically bonded to the benzene rings.

In another embodiment, in the monomeric polyamine reactant of Formula 1, $R^0$ is an organic group represented by Formula 4:

Formula 4 wherein a monovalent amino ($NH_2$) and a monovalent hexafluoroalkyl [$C(CF_3)_2OH$] group are each chemically bonded to the naphthalene rings.

In another embodiment, the monomeric polyamine reactant (A) includes at least one of a compound selected from a tetravalent organic compound represented by Formula 6 or a trivalent organic compound represented by Formula 7:

Formula 6

Formula 7 wherein $R^2$, $R^3$, $R^4$, $R^5$, $R^6$, $R^7$ and $R^8$ are each independently selected from $NH_2$ and $C(CF_3)_2OH$; wherein Y represents an organic group selected from $CH_2$, O, S, C=O, $SO_2$, $C(CH_3)_2$, $C(CF_3)_2$ and combinations thereof, and wherein r represents an integer of 0 or 1.

In another embodiment, the monomeric polyamine reactant in aqueous solution (A) includes at least one of a compound selected from a tetravalent organic compound represented by Formula 8 or a trivalent organic compound represented by Formula 9:

Formula 8

Formula 9 wherein $R^9$, $R^{10}$, $R^{11}$, $R^{12}$, $R^{13}$, $R^{14}$ and $R^{15}$ are each independently selected from $NH_2$ and $C(CF_3)_2OH$.

In another embodiment, the monomeric polyamine reactant in aqueous solution (A) includes at least one of a compound selected from a trivalent organic compound represented by Formula 10 or a tetravalent organic compound represented by Formula 11,

Formula 10

Formula 11 wherein $R^{16}$, $R^{17}$, $R^{18}$, $R^{19}$, $R^{20}$, $R^{21}$ and $R^{22}$ are each independently selected from $NH_2$ and $C(CF_3)_2OH$.

In other embodiments, the monomeric polyamine reactant in the aqueous solution (A) is represented by any of the Formulas 15 through 36, or combinations thereof:

Formula 15

Formula 16

Formula 17

Formula 18

Formula 19

Formula 20

Formula 21

Formula 22

Formula 23

Formula 24

Formula 25

Formula 26

Formula 27

Formula 28

Formula 29

Formula 30

Formula 31

Formula 32

Formula 33

Formula 34

Formula 35

Formula 36

The base used in the aqueous solution (A) may vary widely, and can include an organic base, an inorganic base, and combinations thereof. For example, the base in solution (A) can include inorganic hydroxides, organic hydroxides, carbonates, bicarbonates, sulfides, amines and combinations thereof. Suitable bases include, but are not limited to, NaOH, KOH, $Ca(OH)_2$, $Na_2CO_3$, $K_2CO_3$, $CaCO_3$, $NaHCO_3$, $KHCO_3$, triethyl amine, pyridine, tetramethylammonium hydroxide and combinations thereof.

In some embodiments, $R^1$ in the polyfunctional acyl halide reactant of Formula 2 represents an organic group with 1 to 30 carbon atoms, or 1 to 20 carbon atoms, or 1 to 15 carbon atoms. In some embodiments, in the polyfunctional acyl halide reactant of Formula 2, $R^1$ can include an organic group selected from benzene rings, naphthalene rings, cyclohexane rings, admanthane rings, norbornane rings and combinations thereof.

In some embodiments, $R^1$ in the polyfunctional acyl halide reactant of Formula 2 represents an organic group represented by Formula 12,

Formula 12 wherein W represents an organic group selected from CH$_2$, O, S, C=O, SO$_2$, C(CH$_3$)$_2$, C(CF$_3$)$_2$ and combinations thereof, s represents an integer of 0 or 1, and monovalent COX is chemically bonded to the benzene rings, wherein X is independently selected from fluorine, chlorine, bromine and iodine.

In some embodiments, the monomeric polyfunctional acyl halide reactant in solution (B) includes at least one of a divalent organic compound represented by Formula 10 or a trivalent organic compound represented by Formula 11:

Formula 10

Formula 11 wherein $R^{23}$, $R^{24}$, $R^{25}$, $R^{26}$ and $R^{27}$ are each independently selected from monovalent COX, wherein X is independently selected from fluorine, chlorine, bromine and iodine.

In other embodiments, the monomeric polyfunctional acyl halide reactant in solution (B) includes at least one of a compound selected from a trivalent organic compound represented by Formula 13 or a divalent organic compound represented by Formula 14:

Formula 13

Formula 14 wherein $R^{28}$, $R^{29}$, $R^{30}$, $R^{31}$ and $R^{32}$ are each independently selected from monovalent COX, and X is independently selected from fluorine, chlorine, bromine and iodine, wherein W represents an organic group selected from CH$_2$, O, S, C=O, SO$_2$, C(CH$_3$)$_2$, C(CF$_3$)$_2$ and combinations thereof, and wherein s represents an integer of 0 or 1.

In other embodiments, the monomeric polyfunctional acyl halide reactant in solution (B) includes a compound selected from any of the compounds in Formulas 37 through 61, and combinations thereof:

Formula 37

Formula 38

Formula 39

Formula 40

Formula 41

Formula 42

Formula 43

Formula 44

Formula 45

Formula 46

Formula 47

Formula 48

Formula 48

Formula 49

-continued

Formula 50

Formula 51

Formula 52

Formula 53

Formula 54

Formula 55

Formula 56

Formula 57

Formula 58

Formula 59

Formula 60

Formula 61

The organic solvent used in the organic solution (B) may vary widely, and can include organic compounds with 1 to 20 carbon atoms, or 1 to 16 carbon atoms, or 1 to 12 carbon atoms. Suitable organic solvents include, but are not limited to, n-hexane, n-heptane, n-octane, carbon tetrachloride, chloroform, dichloromethane, chlorobenzene, xylene, toluene, benzene and combinations thereof.

Optionally, a phase transfer catalyst or surfactant or other additives can be added to enhance reactivity or to improve membrane performance.

The concentration of the monomeric polyamine reactants in the aqueous solution (A) or the acyl halide reactants in the organic solution (B) can vary widely. For example, the concentration of the monomeric polyamine reactants in the aqueous solution (A) can range from 0.01% (w/v) to 20% (w/v), or 0.5% to 10% (w/v), or 1% to 5%. Similarly, the concentration of the acryl halide reactants in the organic solution (B) can range from 0.01% (w/v) to 10% (w/v), or 0.05% to 5% (w/v), or 0.1% to 2%.

The functional groups on the monomeric reactants can optionally be selected to provide a crosslinked polymeric reaction product, For example, diamine monomer will always make crosslinked polyamide by reacting with trimesoyl chloride (TMC). After the interfacially polymerized, crosslinked aromatic polyamide has been formed, its crosslink density can be further increased by post-polymerization reactions with crosslinking or molecular weight-increasing agents such as methane sulfonyl halides, epihalohydrins, trimethylamine-sulfur trioxide complex, formaldehyde, glyoxal, and the like.

In one embodiment particularly well suited for making an active layer of a TFC membrane, an aromatic polyamide membrane may be synthesized by interfacial polymerization on a support membrane (such as, for example, a polysulfone ultrafiltration membrane) using hexafluoroalcohol substituted aromatic diamines (for example, HFA-MDA and HFA-ODA) and an aromatic acid chloride such as trimesoyl chloride (TMC) dissolved in aqueous basic solution and organic solvent, respectively (see Reaction 1 below).

Reaction 1

1. HFA-MDA (R=CH$_2$)
2. HFA-ODA (R=O)

3. TMC

-continued

4. HFA-Polyamides

Figure 1:
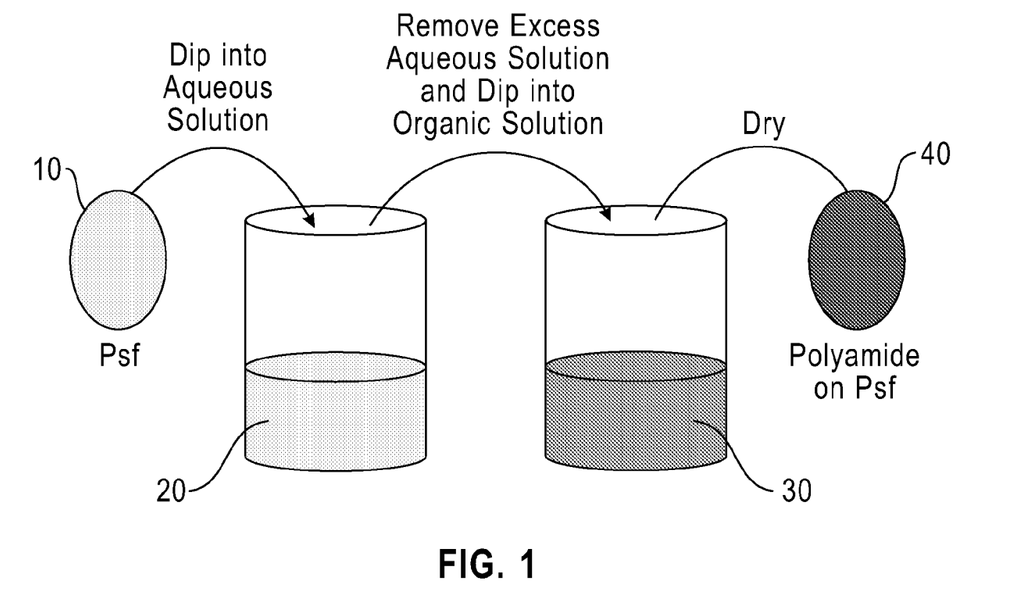
FIG. 1 is schematic diagram of an embodiment of a method for making a hexafluoroalcohol substituted polyamide composite membranes via interfacial polymerization on polysulfone (PSF) support.

FIG. 1 is a schematic diagram showing a preferred embodiment of an interfacial polymerization process for making a TFC composite membrane. Referring to FIG. 1, a pre-treated support membrane 10 is placed in an aqueous basic solution of a hexafluoroalcohol substituted aromatic diamine 20 for several minutes typically about 1 minute to about 5 minutes.

Excess solution is drained from the dip-coated surface of the support membrane (or excess solution is removed by rolling with rubber roller) and the coated support membrane is optionally dried for about 1 minute to about 10 minutes in air at room temperature.

The hexafluoroalcohol substituted diamine saturated membrane is immersed in a solution 30 of an aromatic acid chloride in an organic solvent such as, for example, hexane. After several tens of seconds, preferably about 10 seconds to about 120 seconds, the resulting membrane 40, which includes an active HFA polyamide layer on the support membrane, is removed from the organic solution and dried. The active layer may optionally be rinsed with, for example, 0.2% (w/w) sodium carbonate solution for approximately 5 min and stored in water prior membrane testing.

The drying conditions can vary widely, but in some embodiments the membrane is dried about 1 minutes to about 5 minutes in air at room temperature, or optionally in an oven maintained at a temperature of about 30 to about 70° C. for about 1 minute to about 5 minutes.

Chemical or physical treatments (plasma or UV-ozone) can be optionally used to increase the hydrophilicity of a surface of the support membrane 10, prior to introducing the support membrane 10 into the aqueous diamine solution 20. While not wishing to be bound by any theory, presently available evidence indicates that plasma and/or UV-ozone treatment of a polysulfone support generates a more hydrophilic surface (complete wetting by water), so it enhances the density of the coverage of the ionized HFA-diamine monomer on the support layer.

Additional structural integrity can be provided for the composite membrane by laminating the polyamide/polysulfone composite to a second support film or layer which is preferably a flexible, porous, organic polymeric material which can be fibrous in nature if desired. An example of a fibrous backup or support material is a paper-like web of spun-bonded polymeric (e.g. polyethylene) fibers having diameters in the micrometer range.

Flat sheet-type (for example, spiral wound-type) water purification or permselective modules utilizing the composite membranes described herein are useful for applications such as desalination of seawater, brackish water desalting, whey concentration, electroplating chemical recovery, softening of hard water for municipal or home use, boiler feed water treatment, and other water treatments which involve removal of a solute or contaminant.

Various embodiments of the invention have been described. These and other embodiments are within the scope of the following claims.

EXAMPLES

Example 1

Fabrication and Performance of HFA-MDA Polyamide

Membrane Preparation:

A HFA-MDA polyamide composite membrane was interfacially synthesized on a pre-formed polysulfone (PSF) ultrafiltration membrane. The PSF support membrane was treated with UV-Ozone for 40 sec before interfacial polymerization to increase the coverage of ionized HFA-diamine monomers which were dissolved in an aqueous basic solution. The pre-treated PSF membrane was placed in an aqueous basic solution of 2% (w/v) HFA-MDA diamine (monomer 1 in Reaction 1 above) for 5 minutes, and HFA-MDA soaked support membranes were then rolled with a rubber roller to remove excess solution.

The HFA-MDA saturated membrane was then immersed in a solution of 0.5% (w/v) trimesoyl chloride (TMC) in hexane. After 30 sec of reaction, the resulting membrane was rinsed with an aqueous solution of 0.2% (w/v) sodium carbonate and stored in pure water.

Figure 2A:
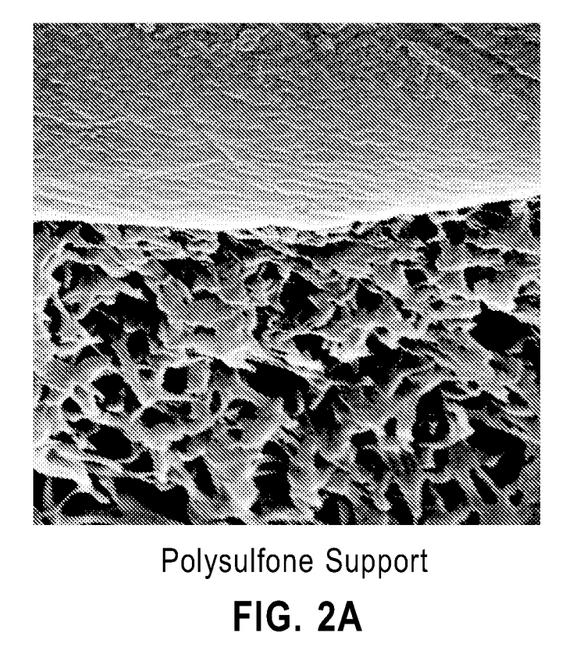
FIG. 2A is a cross-sectional SEM image of a polysulfone support membrane without an active layer.
Figure 2B:
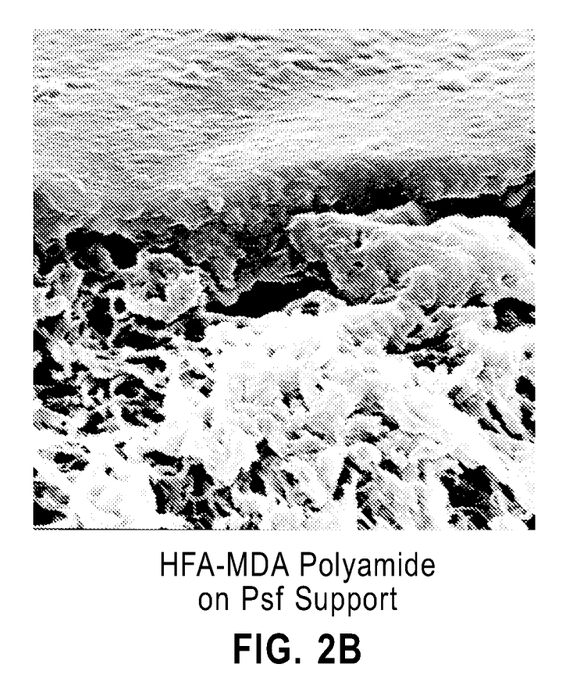
FIG. 2B is a cross-sectional SEM image of a HFA-MDA polyamide composite membrane produced according to Example 1.

Formation of a thin, dense HFA-MDA polyamide was confirmed by a cross-sectional SEM image (thickness: ca. 400 nm, FIG. 2B).

For comparison, non-fluoroalcohol substituted reference polyamide composite membrane was also interfacially synthesized on a pre-formed PSF ultrafiltration membrane. The PSF membrane was placed in aqueous solution of 2% (w/v) phenylenediamine for 2 minutes, and the membrane was then rolled with a rubber roller to remove excess solution. The phenylenediamine saturated membrane was then immersed in a solution of 0.1% (w/v) trimesoyl chloride (TMS) in hexane. After 1 min of reaction, the resulting membrane was rinsed with an aqueous solution of 0.2% (w/v) sodium carbonate and stored in pure water.

Membrane Characterization:

Membrane performance was evaluated using a crossflow filtration system. The pure water flux was measured at room temperature after the membrane was compressed for 5 hours at 400 pounds per square inch (psi). The salt rejection test was then carried out with 2000 ppm aqueous solution of NaCl at the same pressure. The pH of feed water was controlled from 4 to 10 by using diluted HCl and NaOH solutions. The water flux and salt rejection values found with HFA-MDA polyamide membrane were 80 LMH and 95.3% at pH 8, respectively. Water flux was increased to 87 LMH when HFA functionality was ionized at pH 10.

Figure 3A:
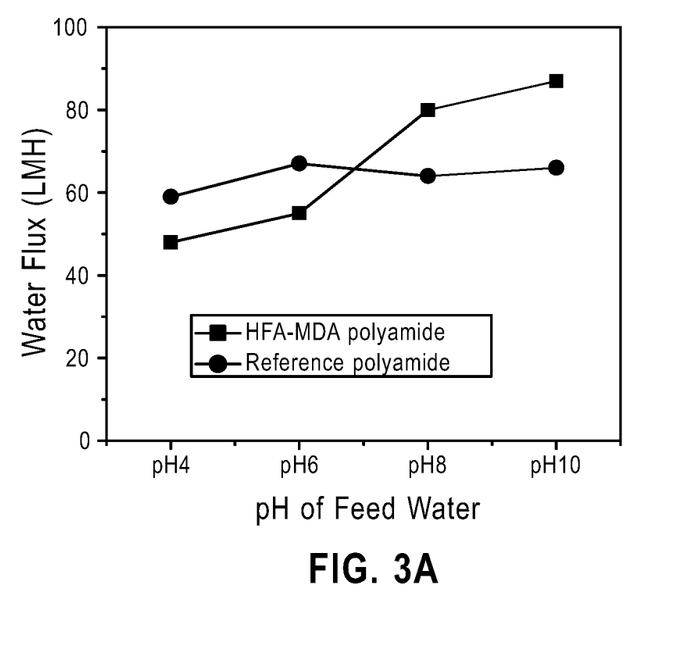
FIG. 3A is a plot showing water flux vs. pH of feed water of HFA-MDA polyamide composite membrane (squares) and non-fluoroalcohol substituted reference polyamide membrane (circles) as set forth in Example 1.
Figure 3B:
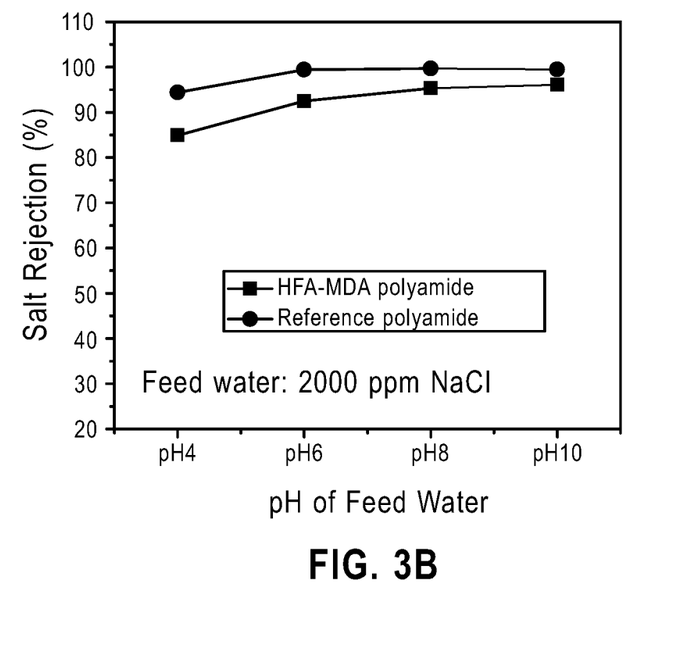
FIG. 3B is a plot showing salt rejection vs. pH of feed water of HFA-MDA polyamide composite membrane (squares) and non-fluoroalcohol substituted reference polyamide membrane (circles) as set forth in Example 1.

The plot in FIG. 3A shows water flux vs. feed water pH and the plot in FIG. 3B shows salt rejection vs. feed water pH.

Blue and black curves exhibit the data of HFA-MDA and reference polyamide, respectively. The HFA-MDA polyamide membranes show strongly pH-dependent RO (reverse osmosis) behavior with enhanced performance at high pH. At high pH (above pH 8), the water flux of HFA-MDA polyamide is much higher than reference polyamide, while the salt-rejection value of HFA-MDA polyamide membranes is almost comparable to the value of reference polyamide as shown in FIGS. 3A-3B.

Example 2

Fabrication and Performance of HFA-ODA Polyamide

A HFA-ODA polyamide composite membrane was prepared from 2% (w/v) HFA-ODA diamine (monomer 2 in Reaction 1) and TMC under same conditions described in Example 1.

Membrane performance was also evaluated in the same manner as Example 1. The water flux and salt rejection values measured with HFA-ODA polyamide membrane were 60 LMH and 96.5% at pH 8, respectively. Water flux was increased to 71 LMH when HFA functionality was ionized at pH 10.

Example 3

Chlorine Resistance Test Using Model Polyamide Polymers

Synthesis of Model Polymer, HFA-MDA Polyamide:
To a 100-ml three-necked flask fitted with nitrogen inlet and outlet tubes, HFA-MDA diamine (1.50 g) and DMAc (8 ml) were added. After making solution, the flask was placed in dry ice/acetone bath. After freezing solution, isophtaloyl chloride (0.57 g) and DMAc (2 ml) were added, and then the mixture was stirred using a mechanical stirrer in ice/water bath for 3 hours through nitrogen and then at room temperature for 20 hours through nitrogen. After precipitation in methanol, the polymer (1.87 g) was obtained by filtration and drying at 60° C. under vacuum: giving Mw(Mw/Mn)=118,000 (1.67).

Synthesis of Model Polymer, Non-Fluoroalcohol Substituted Reference Polyamide:
A reference polyamide was synthesized from phenylenediamine and DMAc under same conditions used for making HFA-MDA polyamide.

Chlorine Resistance of Model Polymers:
The chlorine resistance of a HFA-MDA polyamide was compared with a reference polyamide through NMR spectroscopic analysis

Figure 4:
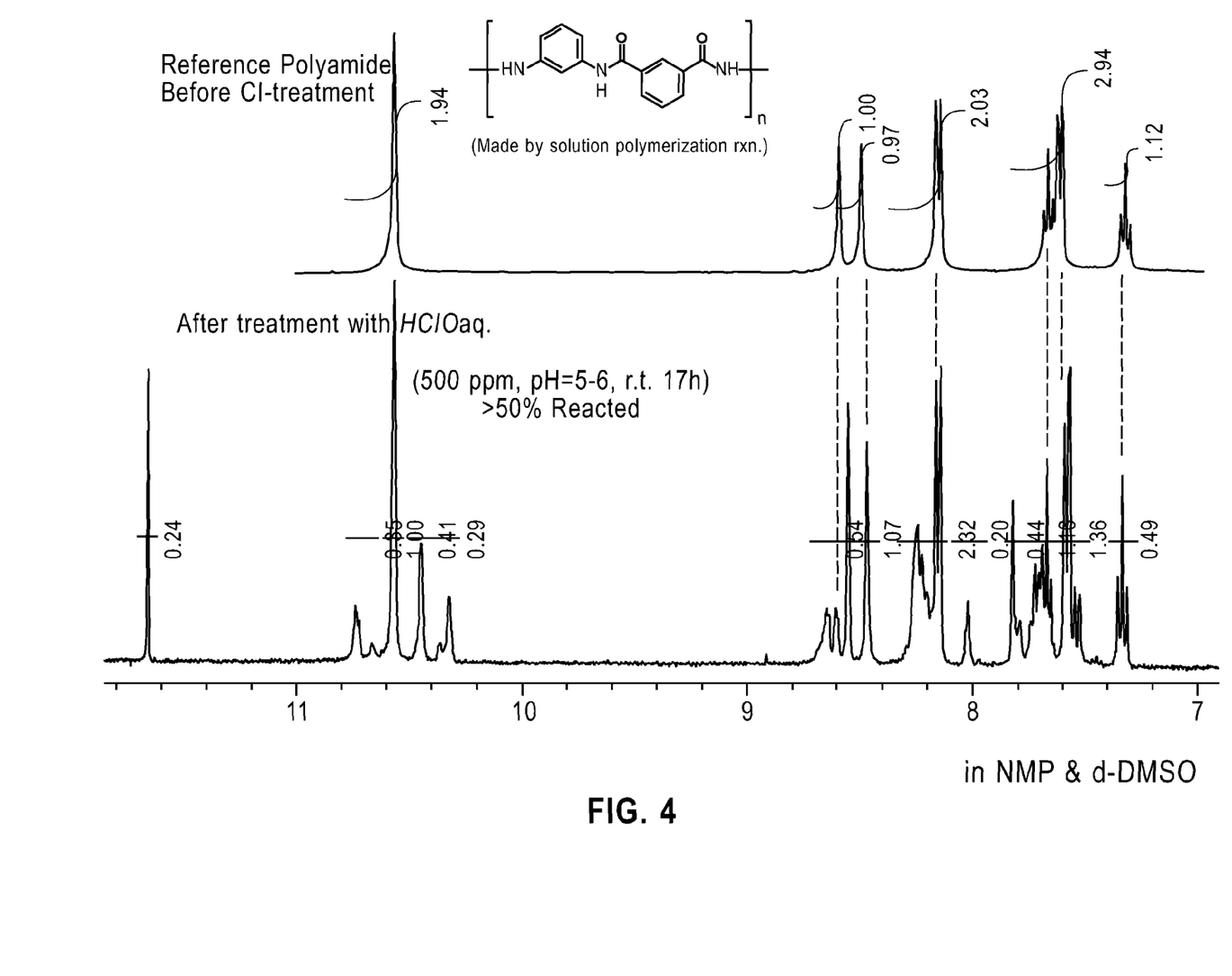
FIG. 4 are NMR spectra of non-fluoroalcohol substituted reference polyamides obtained before (upper spectrum) and after chlorine treatment (bottom spectrum) as described in Example 3.
Figure 5:
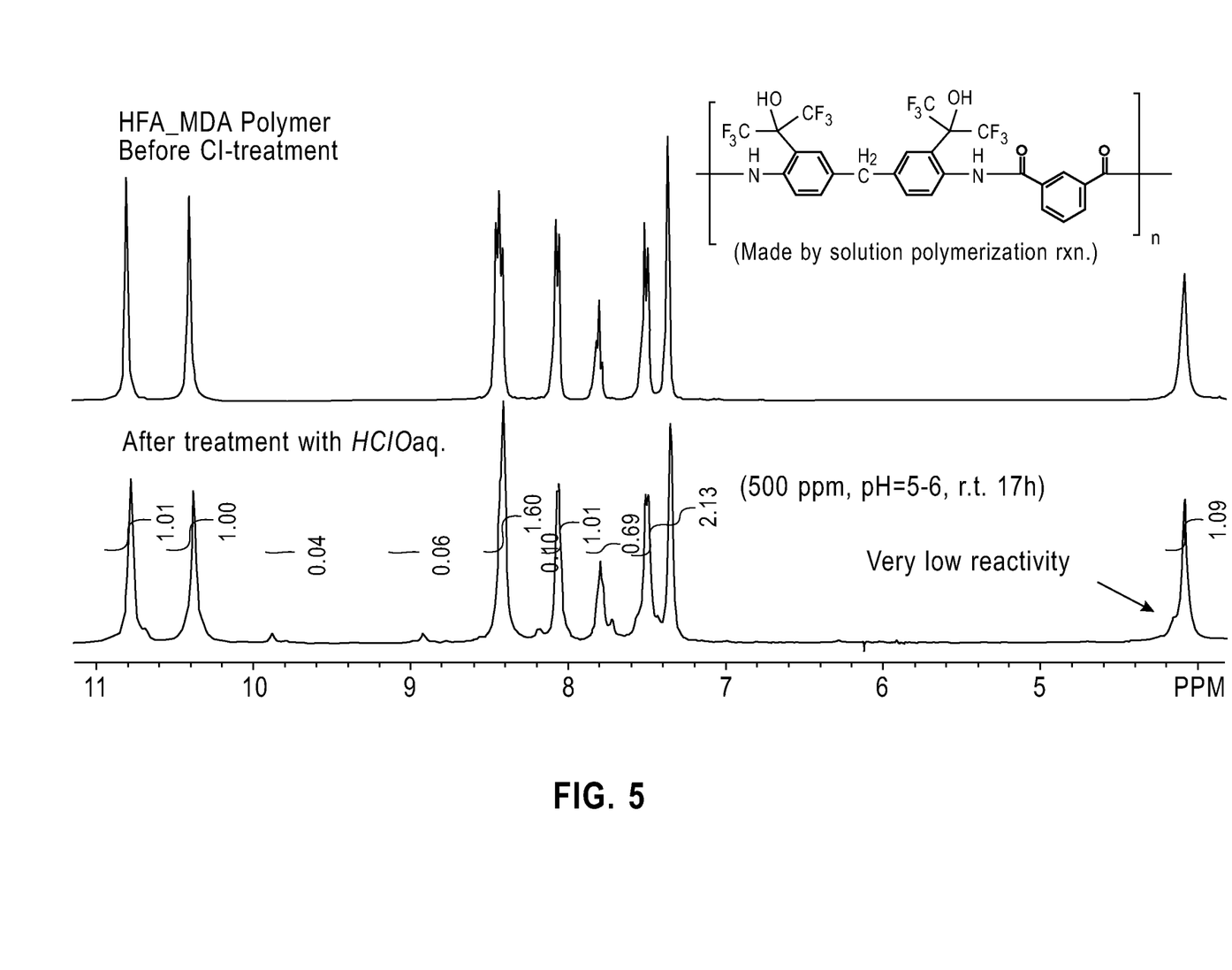
FIG. 5 NMR spectra of HFA-MDA polyamides obtained before (upper spectrum) and after chlorine treatment (bottom spectrum) as described in Example 3.

Both model polymers were immersed into aqueous solution of 500 ppm HOCl (pH 5~6) and stirred. After 17 hours, the non-substituted reference polyamide was severely attacked by chlorine (FIG. 4, more than 50% of chlorination), while the HFA-MDA polyamide showed less than 10% chlorination (FIG. 5). This NMR result suggests that the reference polyamides are much more susceptible to attack by the chlorine-containing reagent and that the HFA-bearing polyamides are much more inert.

Various embodiments of the invention have been described. These and other embodiments are within the scope of the following claims.

The invention claimed is:

1. A polymeric membrane comprising an active layer that is on a support, wherein the active layer comprises a polymer with a backbone having attached thereto at least one fluoroalcohol moiety, wherein the polymer in the active layer is derived by reacting a chemical mixture (A) and a chemical mixture (B), wherein (A) and (B) are immiscible with each other, and wherein:

(A) is an aqueous base comprising a monomeric polyamine reactant having one or more hexafluoroalcohol groups represented by Formula 1:

Formula 1 wherein $R^0$ represents an organic group selected from the group consisting of aliphatic, alicyclic, aromatic, heterocyclic groups and combinations thereof, m is an integer of 2 or more, and n is an integer of 1 or more, and (B) is organic, and comprises a monomeric polyfunctional acyl halide reactant represented by Formula 2:

Formula 2 wherein $R^1$ represents an organic group selected from the group containing aliphatic alicyclic, aromatic, heterocyclic groups and combinations thereof, X is selected from the group consisting of fluorine, chlorine, bromine and iodine, and p represents an integer of 2 or more.

2. The membrane of claim 1, wherein the fluoroalcohol moieties on the polymer are in a neutral form, an ionic form, or a combination thereof.

3. The membrane of claim 1, wherein the active layer is crosslinked.

4. The membrane of claim 1, wherein the support comprises a polysulfone.

5. The membrane of claim 1, wherein $R^0$ is an organic group with 2 to 30 carbon atoms.

6. The membrane of claim 1, wherein $R^1$ is an organic group with 1 to 30 carbon atoms.

7. The membrane of claim 5, wherein $R^0$ is an organic group selected from the group consisting of benzene, naphthalene, cyclohexane, admanthane, norbornane, and combinations thereof.

8. The membrane of claim 6, wherein $R^1$ is an organic group selected from the group consisting of benzene, naphthalene, cyclohexane, admanthane, norbornane, and combinations thereof.

9. The membrane of claim 1, wherein the base in solution (A) is selected from the group consisting of NaOH, KOH, $Ca(OH)_2$, $Na_2CO_3$, $K_2CO_3$, $CaCO_3$, $NaHCO_3$, $KHCO_3$, triethyl amine, pyridine, tetramethylammonium hydroxide and combinations thereof.

10. The membrane of claim 1, wherein the organic solvent is selected from the group consisting of n-hexane, n-heptane, n-octane, carbon tetrachloride, chloroform, dichloromethane, chlorobenzene, xylene, toluene, benzene, and combinations thereof.

11. The membrane of claim 1, wherein $R^0$ is an organic group represented by Formula 3:

Formula 3 wherein Y is selected from the group consisting of $CH_2$, O, S, C=O, $SO_2$, $C(CH_3)_2$, $C(CF_3)_2$ and combinations thereof, r is an integer of 0 or 1, and wherein each benzene ring in Formula 3 is chemically bonded to monovalent $NH_2$ and monovalent $C(CF_3)_2OH$.

12. The membrane of claim 1, wherein $R^0$ is an organic group represented by Formula 4:

Formula 4 wherein the naphthalene ring in Formula 4 is chemically bonded to monovalent $NH_2$ and monovalent $C(CF_3)_2OH$.

13. The membrane of claim 1, wherein the monomeric polyamine reactant in (A) comprises a compound selected from a tetravalent organic compound of Formula 6 or a trivalent organic compound of Formula 7:

Formula 6

Formula 7 wherein $R^2$, $R^3$, $R^4$, $R^5$, $R^6$, $R^7$ and $R^8$ are each independently selected from the group consisting of $NH_2$ and $C(CF_3)_2OH$, wherein Y is selected from the group consisting of $CH_2$, O, S, C=O, $SO_2$, $C(CH_3)_2$, $C(CF_3)_2$ and combinations thereof, and wherein r is an integer of 0 or 1.

14. The membrane of claim 1, wherein the monomeric polyamine reactant comprises a compound selected from a tetravalent organic compound represented by Formula 8 or a trivalent organic compound represented by Formula 9:

Formula 8

Formula 9 wherein $R^9$, $R^{10}$, $R^{11}$, $R^{12}$, $R^{13}$, $R^{14}$ and $R^{15}$ are each independently selected from the group consisting of $NH_2$ and $C(CF_3)_2OH$.

15. The membrane of claim 1, wherein the monomeric polyamine reactant comprises a compound selected from a trivalent organic compound represented by Formula 10 or a tetravalent organic compound represented by Formula 11:

Formula 10

Formula 11 wherein $R^{16}$, $R^{17}$, $R^{18}$, $R^{19}$, $R^{20}$, $R^{21}$ and $R^{22}$ are each independently selected from the group consisting of $NH_2$ and $C(CF_3)_2OH$.

16. The membrane of claim 1, wherein the monomeric polyfunctional acyl halide reactant comprises a compound selected from a divalent organic compound represented by Formula 10 or a trivalent organic compound represented by Formula 11:

Formula 10

Formula 11 wherein $R^{23}$, $R^{24}$, $R^{25}$, $R^{26}$ and $R^{27}$ are each independently selected from the group consisting of monovalent COX, and wherein X is selected from the group consisting of fluorine, chlorine, bromine and iodine.

17. The membrane of claim 1, wherein $R^1$ represents an organic group represented by Formula 12:

Formula 12 wherein W represents an organic group selected from $CH_2$, O, S, C=O, $SO_2$, $C(CH_3)_2$, $C(CF_3)_2$ and combinations thereof, wherein s represents an integer of 0 or 1, and wherein monovalent COX is chemically bonded to the benzene rings of Formula 12.

18. The membrane of claim 1, wherein the monomeric polyfunctional acyl halide reactant comprises a compound selected from a trivalent organic compound represented by Formula 13 or a divalent organic compound represented by Formula 14:

Formula 13

Formula 14 wherein $R^{28}$, $R^{29}$, $R^{30}$, $R^{31}$ and $R^{32}$ are each independently selected from the group consisting of monovalent COX, wherein X is selected from the group consisting of fluorine, chlorine, bromine and iodine, wherein W represents an organic group selected from $CH_2$, O, S, C=O, $SO_2$, $C(CH_3)_2$, $C(CF_3)_2$ and combinations thereof, and wherein s represents an integer of 0 or 1.

19. The membrane of claim 1, wherein the monomeric polyamine reactant is represented by any of the Formulas 15 through 36:

Formula 15

Formula 16

Formula 17

Formula 18

Formula 19

Formula 20

Formula 21

Formula 22

Formula 23

Formula 24

Formula 25

Formula 26

Formula 27

Formula 28

-continued

20. The membrane of claim 1, wherein the monomeric polyfunctional acyl halide reactant is represented by any of the Formulas 37 through 61.

21. The membrane of claim 1, wherein the chemical mixtures (A) and (B) are each independently selected from solutions, dispersions and combinations thereof.

22. The membrane of claim 1, wherein the chemical mixtures (A) and (B) are each solutions.

23. A process for making a membrane, comprising:
inserting a support membrane into an aqueous base solution comprising a monomeric polyamine reactant having one or more hexafluoroalcohol groups represented by Formula 1:

$$\left( HO - \underset{CF_3}{\overset{CF_3}{|}} - R^0 \!-\!\!\!\!+\!\!\!\!- NH_2)_m \right)_n \qquad \text{Formula 1}$$

wherein $R^0$ represents an organic group selected from the group consisting of aliphatic, alicyclic, aromatic, heterocyclic groups and combinations thereof, m is an integer of 2 or more, and n is an integer of 1 or more; and
inserting the support membrane having thereon the aqueous base solution into an organic solution comprising a monomeric polyfunctional acyl halide reactant represented by Formula 2:

$$R^1\!\!-\!\!(COX)_p \qquad \text{Formula 2}$$

wherein $R^1$ represents an organic group selected from the group containing aliphatic alicyclic, aromatic, heterocyclic groups and combinations thereof, X is selected from the group consisting of fluorine, chlorine, bromine and iodine, and p represents an integer of 2 or more.

24. The method of claim 23, comprising drying the support membrane to form a composite membrane with an active layer, wherein the active layer comprises a hexafluoroalcohol substituted polymer.

25. The method of claim 23, comprising drying the support membrane prior to insertion into the organic solution.

26. The method of claim 23, comprising treating a surface of the support membrane to increase its hydrophilicity prior to insertion into the aqueous solution.

27. The method of claim 26, wherein the surface of the support membrane is treated with at least one of plasma and UV-ozone.

28. The method of claim 23, wherein the support membrane comprises a polysulfone.

29. The method of claim 23, wherein the active layer has a thickness of about 100 to about 500 nm.

30. A method comprising purifying water with the membrane of claim 1.

31. A method comprising desalinating water with the membrane of claim 1.

32. The membrane of claim 1, wherein the fluoroalcohol moiety is a 1,1,1,3,3,3-hexafluoro-2-hydroxyisopropyl group.

33. A method, comprising:
synthesizing an active layer on a support membrane by interfacial polymerization, wherein the synthesis comprises reacting on a surface of the support membrane:
(A) an aqueous base solution comprising a monomeric polyamine reactant having one or more hexafluoroalcohol groups represented by Formula 1:

Formula 1 wherein $R^0$ represents an organic group selected from the group consisting of aliphatic, alicyclic, aromatic, heterocyclic groups and combinations thereof, m is an integer of 2 or more, and n is an integer of 1 or more; and (B) an organic solution comprising a monomeric polyfunctional acyl halide reactant represented by Formula 2:

Formula 2 wherein $R^1$ represents an organic group selected from the group containing aliphatic alicyclic, aromatic, heterocyclic groups and combinations thereof, X is selected from the group consisting of fluorine, chlorine, bromine and iodine, and p represents an integer of 2 or more.

34. The method of claim 33, wherein the active layer comprises a hexafluoroalcohol substituted polymer.

\* \* \* \* \*